United States Patent
Baumann et al.

(10) Patent No.: US 6,274,961 B1
(45) Date of Patent: Aug. 14, 2001

(54) ELASTIC INSULATING MATERIAL ELEMENT FOR WEDGING A WINDING, IN PARTICULAR THE STATOR WINDING, OF AN ELECTRIC MACHINE

(75) Inventors: Thomas Baumann, Wettingen; Reinhard Joho, Küttigen; Jörg Oesterheld, Fislisbach, all of (CH)

(73) Assignee: ABB Research Ltd., Zurich (CH)

( * ) Notice: Subject to any disclaimer, the term of this patent is extended or adjusted under 35 U.S.C. 154(b) by 0 days.

(21) Appl. No.: 09/343,394

(22) Filed: Jun. 30, 1999

(30) Foreign Application Priority Data

Jul. 2, 1998 (DE) .............................. 198 29 578

(51) Int. Cl.⁷ .............................. H02K 3/48; H02K 1/04
(52) U.S. Cl. .............................. 310/214; 310/43
(58) Field of Search .............................. 310/201, 214–215, 310/42, 43, 179, 180, 192, 194, 254, 260

(56) References Cited

U.S. PATENT DOCUMENTS

| 871,758 | * | 11/1907 | Heitmann et al. | 310/214 |
| 2,015,554 | * | 9/1935 | Fisher | 310/214 |
| 3,437,858 | | 4/1969 | White | 310/214 |
| 3,949,255 | | 4/1976 | Brown et al. | 310/214 |
| 3,976,901 | * | 8/1976 | Liptak et al. | 310/214 |
| 4,200,816 | | 4/1980 | Hopkins | 310/168 |
| 4,369,389 | * | 1/1983 | Lambrecht | 310/214 |
| 4,572,980 | * | 2/1986 | Anderson et al. | 310/214 |
| 4,607,183 | * | 8/1986 | Rieber et al. | 310/214 |
| 5,477,095 | * | 12/1995 | Kleinburger et al. | 310/215 |
| 5,598,049 | * | 1/1997 | Meier | 310/214 |
| 5,760,516 | * | 6/1998 | Baumann et al. | 310/201 |

FOREIGN PATENT DOCUMENTS

| 245805 | 7/1910 | (DE) . |
| 1 953 386 | 5/1971 | (DE) . |
| 662 911 A5 | 10/1987 | (DE) . |
| 3590701558A | * 4/1984 | (JP) . |
| 359136039A | * 8/1984 | (JP) . |

* cited by examiner

Primary Examiner—Nestor Ramirez
Assistant Examiner—Guillermo Perez
(74) Attorney, Agent, or Firm—Burns, Doane, Swecker & Mathis, L.L.P.

(57) ABSTRACT

In an elastic insulating material element for wedging a winding, in particular the stator winding, of an electric machine in the slots provided for this purpose in a laminated body, good mechanical and, at the same time, electric properties are achieved in that the insulating material element (10) has a striplike metal spring core (11) which is surrounded on all sides by a casing (12) made of an insulating material.

25 Claims, 5 Drawing Sheets

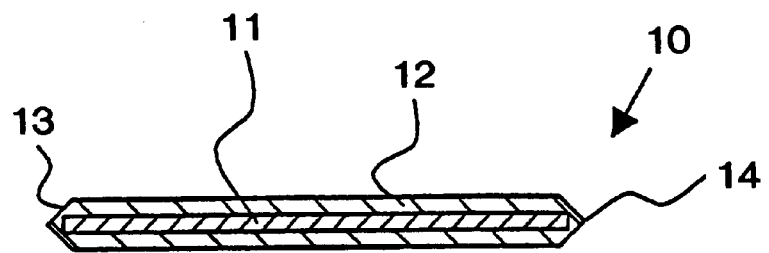
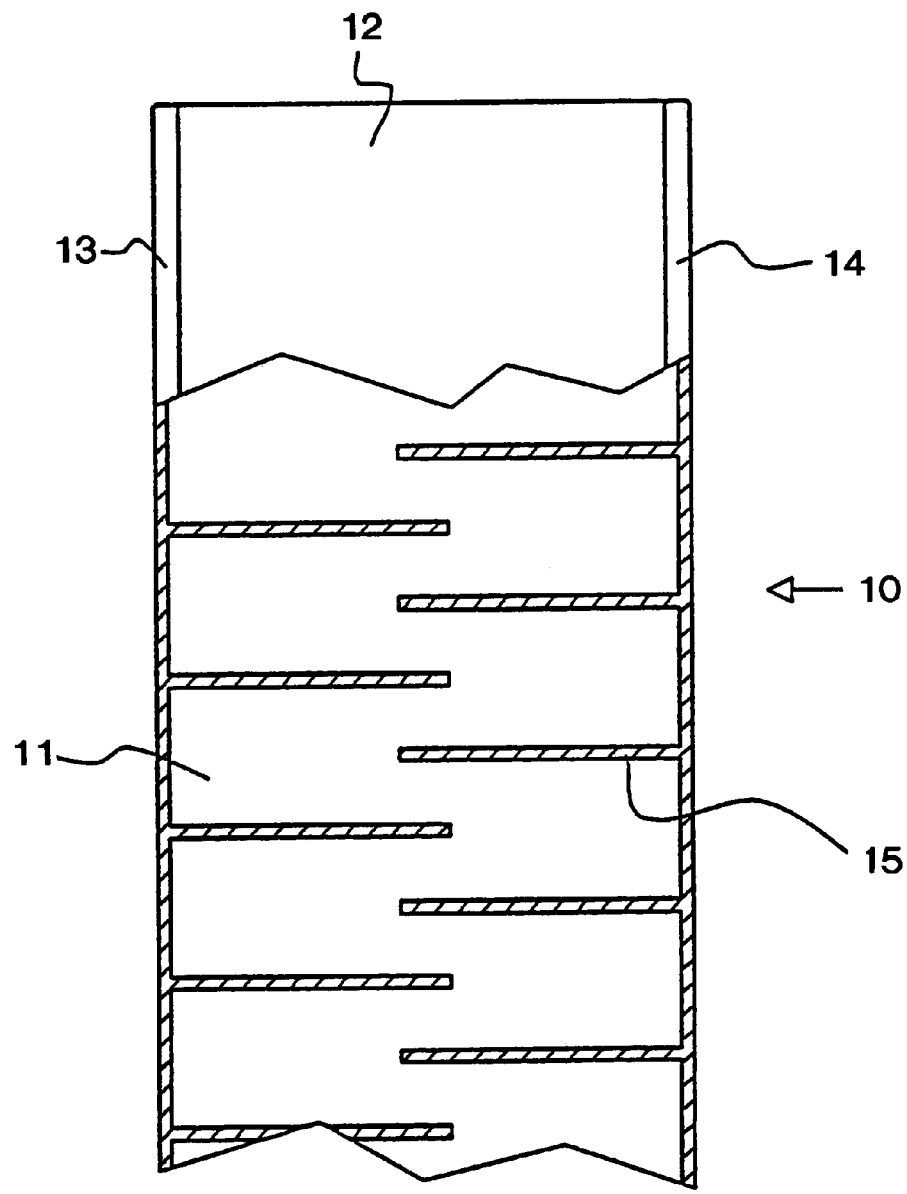

ELASTIC INSULATING MATERIAL ELEMENT FOR WEDGING A WINDING, IN PARTICULAR THE STATOR WINDING, OF AN ELECTRIC MACHINE

BACKGROUND OF THE INVENTION

1. Field of the Invention

The present invention relates to the technical field of rotating electric machines. It refers to an elastic insulating material element for wedging a winding, in particular the stator winding, of an electric machine in the slots provided for this purpose in a laminated body.

Such an insulating material element is known, for example, from the publication U.S. Pat. No. 3,949,255 or U.S. Pat. No. 4,200,816.

2. Description of Background

Elastic insulating material elements are employed, in particular in the stators of rotating electric machines, for elastic fastening (wedging) of the stator winding in the slots of the laminated body. The stator windings are, as a rule, insulated conductor bundles of rectangular cross section which are inserted with slight play into slots of the stator body. In order to ensure a firm fit of the winding in the slot, the wedging must withstand stresses due to the intrinsic mass of the winding and to electromagnetic forces occurring during operation and in the event of a short circuit, in such a way that it does not become possible for the winding to be loosened and to vibrate.

Conventional slot wedges, in particular for relatively small machine units, consist of an insulating material which is worked or machined in the form of a prism. As a rule, glass-fiber reinforced epoxy resin is used as insulating material (see, for example, U.S. Pat. No. 4,200,818). With the aid of a plastically elastic intermediate layer (fleece, felt), these wedges are adhesively bonded axially into the slots of the toothed tips of the lamination stack and partly, in an impregnating process, to the winding and the lamination body. Another conventional wedge design is based on the action of double wedges. Two flat wedges located one above the other are pushed into the wedge slots, the prestressing force being built up by one flat wedge being driven axially (see, for example, U.S. Pat. No. 3,949,255).

A disadvantage of both forms of wedge is that the wedge design is inherently rigid and inflexible. The prestressing force is undefined. Thermal expansions of the slot packing result, due to rigid wedging, in an enormous increase in the pressure forces exerted on the slot packing, and this may lead to a pronounced settling of the slot packing, with the resulting undesirable loosening of the winding.

Wedging with the aid of plastic corrugated springs (U.S. Pat. No. 3,949,255) eliminates the disadvantage of inelastic wedging. For this purpose, elastic corrugated springs are inserted between a rigid wedge and a winding (or between two rigid wedges). The necessary prestressing force is achieved by the defined compression of the corrugated spring. Shrinkage of the slot packing due to settling processes is compensated by the respringing of the corrugated spring. Use of elastic wedges is another solution for achieving elastic wedging. By means of appropriately thin wedges or centrally cut-out wedges (convex/concave wedges), the flexibility of the wedges is increased and the prestressing forces are reduced. With this solution, too, settling processes in the slot packing can be compensated to some extent.

In both elastic wedging methods, maintaining the minimum prestressing force permanently is ensured only when the elastic plastic elements also preserve their elastic properties completely. It is known, however, that all reinforced plastics tend to yield or creep under constant bending stress and, in particular, increased temperatures. As complicated tests have shown, considerable yield is already to be expected at normal operating temperatures, even when fiber reinforced plastics with heat-resistant binders are used. In the event of operating faults in which temperatures are increased even further for a short time, yield of this kind may become critical, so that there is the possibility of loosening of the winding.

SUMMARY OF THE INVENTION

Accordingly, one object of the invention is to provide a novel insulating material element for the wedging of windings, in which element yield/creep of the insulating material or the effects of yield/creep of the insulating material on the elastic behavior of the wedging can be reliably avoided.

In an insulating material element of the type initially mentioned, the object is achieved in that the insulating material element has a striplike metal spring core which is surrounded on all sides by a casing made of an insulating material. The essence of the invention is that the insulating material body is no longer used as the elastic element, but, instead, the metal spring core embedded therein. In this case, the insulating material is functionally necessary only for the electric insulation of the metal spring core and, if appropriate, additionally for shaping the corresponding structural part. By contrast, its contribution to the mechanical behavior of the structural part must, at most, still be marginal. The metal spring core, which preferably consists of a nonmagnetic resilient metal, in particular of a high-grade steel, and has a thickness of a few millimeters, preferably between 2 and 3 mm, exhibits virtually no yield behavior even at relatively high temperatures.

A first preferred embodiment of the insulating material element according to the invention is defined in that the metal spring core has means by which eddy currents induced in said metal spring core are limited. This prevents strong eddy currents, along with the corresponding thermal effects in the elements, from being excited as a result of the high airgap induction in the machine. A preferred development of this embodiment is distinguished in that the means for limiting induced eddy currents comprise slitlike incisions which, arranged so as to be distributed in the longitudinal direction of the metal spring core, project into the interior of said metal spring core, in each case starting from the longitudinal edges of the latter. The metal spring core is subdivided into individual sectors by the provision of the incisions. This ensures that possible loops, in which eddy currents can flow, are limited to electrically and thermally uncritical geometric dimensions. The slitting is, at the same time, to be arranged in such a way that the mechanical spring action of the metal spring core remains optimal. This may be achieved, for example, in that the incisions project into the interior of the metal spring core alternately from the opposite longitudinal edges of the latter, and in that the incisions starting from the different longitudinal edges overlap in the interior of the metal spring core.

The casing of the insulating material element according to the invention preferably consists of a fiber reinforced plastic, in particular a high-temperature thermoset or high-temperature thermoplastic. This ensures that the settling of the casing material or embedding material under compressive stress is negligibly small.

In order to avoid delamination due to shear stresses, according to a further preferred embodiment additional means are provided for improving the mechanical connection between the metal spring core and the casing. For this purpose, on the one hand, it may be considered to pretreat the metal spring core with an adhesion promoter; on the other hand, as an additional means for improving the mechanical connection, the metal spring core may be provided with bores arranged in a distributed manner. In addition to good adhesive bonding, however, the incisions (slits) in the metal spring core, which are provided on account of the eddy currents, also ensure a uniform introduction of force because of the resulting positive connection with the embedding material.

The insulating material element according to the invention may selectively be designed both as a slot wedge and as a corrugated spring and be used solely as a slot wedge or as a corrugated spring or in a combination of a slot wedge and corrugated spring.

If the element is designed as a slot wedge, it may preferably have a concave cross-sectional profile on the underside and a convex cross-sectional profile on the top side. The elastic mechanical properties can be positively influenced thereby.

If the element is designed as a corrugated spring, the metal spring core is designed to be corrugated. In this case, the corrugations preferably form an angle of less than 90°, in particular about 45°, with the longitudinal direction of the corrugated spring. If the metal spring core is formed from a strip having straight longitudinal edges, and if incisions are provided in the metal spring core in order to limit the eddy currents, the incisions run essentially perpendicularly to the corrugations, thereby simultaneously achieving optimal elastic and electric properties of the corrugated spring.

Further embodiments may be gathered from the dependent claims.

BRIEF DESCRIPTION OF THE DRAWINGS

A more complete appreciation of the invention and many of the intended advantages thereof will be readily obtained as the same becomes better understood by reference to the following detailed description when considered in connection to the accompanying drawings, wherein:

FIG. 1 shows, in cross section, a preferred embodiment of an insulating material element according to the invention in the form a slot wedge;

FIG. 2 shows a partially sectional top view of a slot wedge according to FIG. 1, with overlapping (meander-like) incisions for the reduction of eddy currents;

DESCRIPTION OF THE PREFERRED EMBODIMENTS

Figure 4:
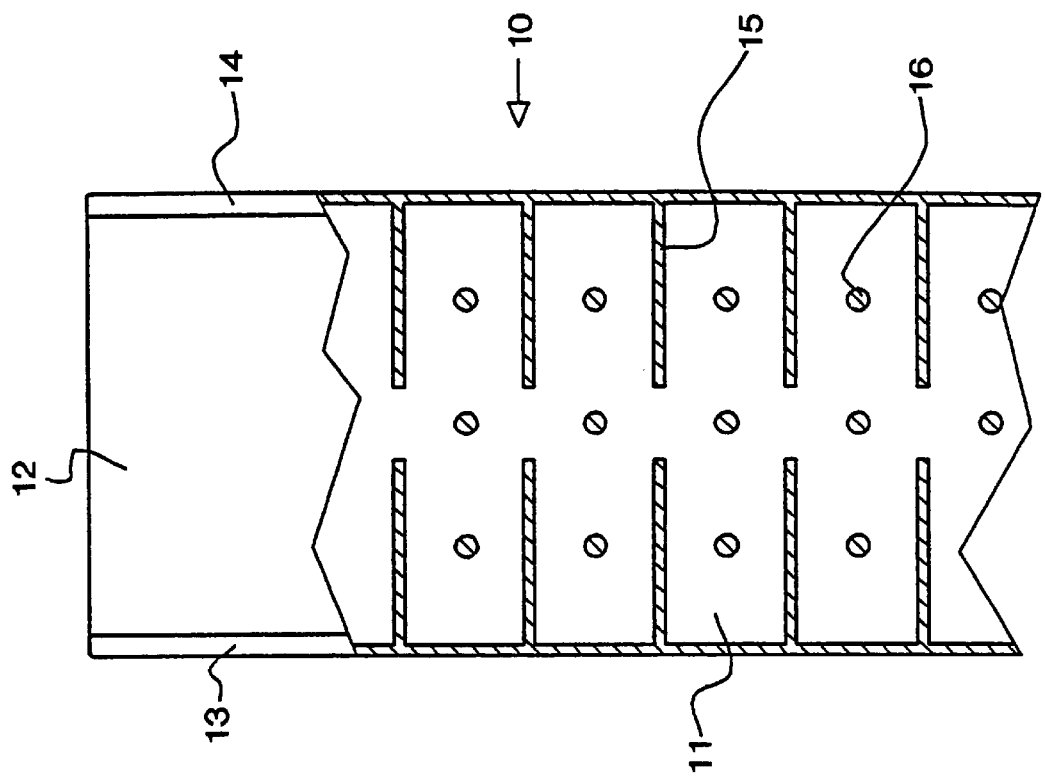
FIG. 4 shows a slot wedge comparable to that of FIG. 2, with (fishbone-like) incisions assigned to one another in pairs and with additional bores for improved positive connection between the metal spring core and casing.

Referring now to the drawings, wherein like reference numerals designate identical or corresponding parts throughout the several views, FIGS. 1 and 2 show a cross section and a partially sectional top view of a first preferred exemplary embodiment of an insulating material element according to the invention in the form of a slot wedge 10. The slot wedge 10 is designed as a flat elongate strip and is delimited laterally by two V-shaped longitudinal sides 13, 14, thus resulting, overall, in a prismatic cross-sectional profile (FIG. 1), as is conventional for, and characteristic of, slot wedges. The slot wedge 10 comprises a metal spring core 11 in the form of a sheet metal strip surrounded on all sides by a casing 12 which is made of insulating material and which prevents direct contact of the core with the lamination body of the stator and, consequently, stray lamination currents with local hot spots and the risk of massive lamination shunts. The metal spring core 11 has preferably a simple rectangular cross section and has a thickness of a plurality of millimeters, in particular in the range of 2 to 3 mm. It preferably consists of a heat-resistant nonmagnetic metal with spring properties, for example a high-grade steel. The casing 12 not only has an insulating function, but at the same time serves for giving the slot wedge 10 the necessary prismatic cross-sectional profile in a simple way by corresponding shaping.

The metal spring core 11 is embedded into the casing 12 made of a glass-fiber reinforced plastic. For this purpose, all thermosets, as well as thermoplastics, which are to be appropriately selected according to the temperature range envisaged, are suitable as binders. It must be remembered that, in this use, the plastic is functionally necessary only for insulating the metal spring core and, if appropriate, additionally for the (for example, prismatic) shaping of the slot wedge 10. By contrast, its contribution to the mechanical behavior of the structural part is, at most, marginal. It is necessary, however, to ensure that the settling of the embedding material under compressive stress should be negligibly small, and for this reason unreinforced plastics seem to be less suitable for this purpose. The selection of the fiber reinforced plastic for the casing 12 and of the pretreatment of the metal spring core 11 (for example, by the use of an adhesion promoter) must allow for good interfacial adhesion (adhesive bonding), in order to avoid delaminations due to shearing stresses.

As well as the electric insulation of the metal spring core 11, it is additionally necessary to ensure that strong eddy currents, along with the corresponding thermal effects in the metal spring core 11, are not excited by the high airgap induction prevailing at the place of use. This is achieved by not giving the metal spring core 11 a continuously solid design, but, according to FIG. 2, by subdividing it into individual sectors, interconnected in a meander-like manner, by means of alternately arranged incisions 15 running from the longitudinal edges 13, 14 into the interior and overlapping in the interior. This ensures that possible loops, in which eddy currents can flow, are limited to electrically and thermally uncritical geometric dimensions. At the same time, the slitting associated with the incisions 15 is to be arranged in such a way that the mechanical spring action of the metal spring core 11 is optimally maintained.

Figure 3:
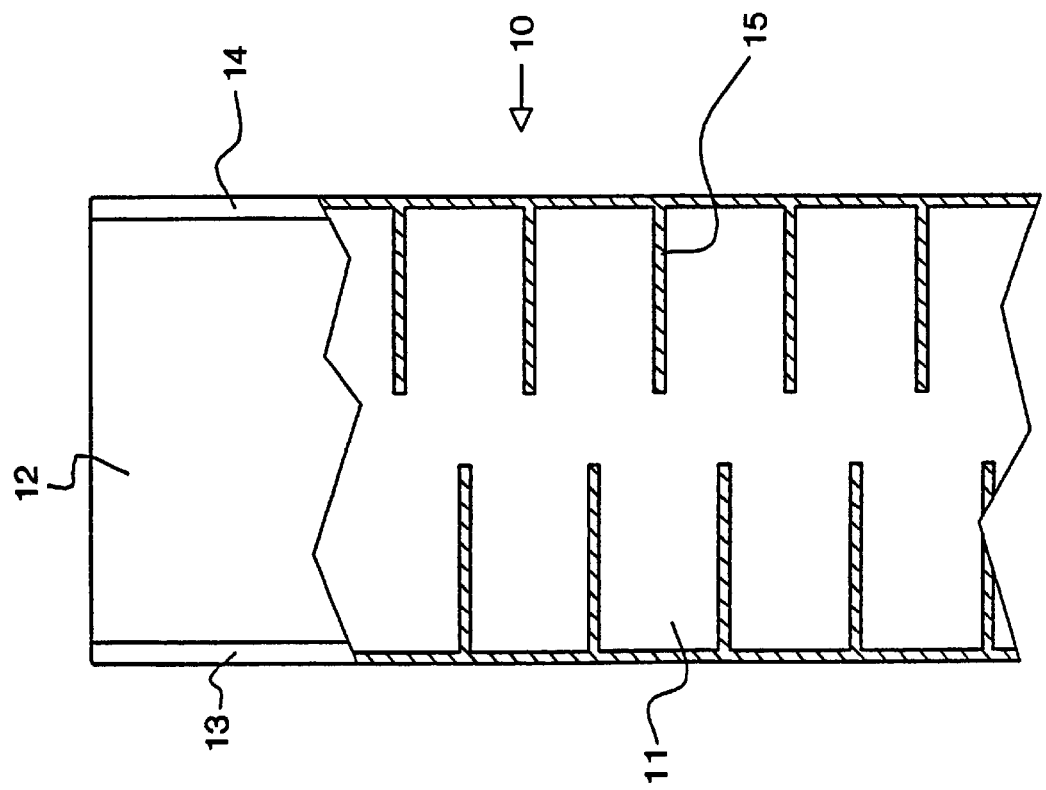
FIG. 3 shows a slot wedge comparable to that of FIG. 2, with incisions which do not overlap.

Instead of the slitting shown in FIG. 2, with the incisions 15 overlapping in the interior of the metal spring core 11, other arrangements of the incisions 15 may, of course, also be envisaged. In the exemplary embodiment illustrated in FIG. 3, the incisions 15, although also being arranged in an alternating manner, do not overlap one another. A somewhat different mechanical behavior of the structural part is thereby afforded. At the same time, the internal design of the slot wedge 10 from FIG. 3 is, in cross section, the same as in the exemplary embodiment from FIG. 1.

Another embodiment of the slitting, the internal design otherwise being the same, is reproduced in FIG. 4. Here, the incisions 15, starting from the two longitudinal edges 13, 14, are located opposite one another in pairs and thus form a fishbone-like incision pattern. In this exemplary embodiment, in addition to the incisions 15, bores 16 are also arranged, distributed, in the intermediate sectors. In addition to the incisions 15 already present, this further improves the positive connection between the metal spring core 11 and the embedding material of the casing 12. Instead of the bores 16, other types of regularly or irregularly shaped recesses may, of course, also be provided for this purpose.

Figure 5:
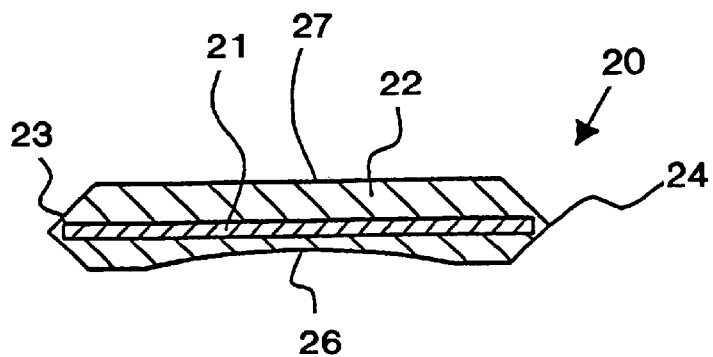
FIG. 5 shows an illustration, comparable to that of FIG. 1, of a slot wedge according to the invention with a convex/concave casing for varying the mechanical properties.
Figure 6:
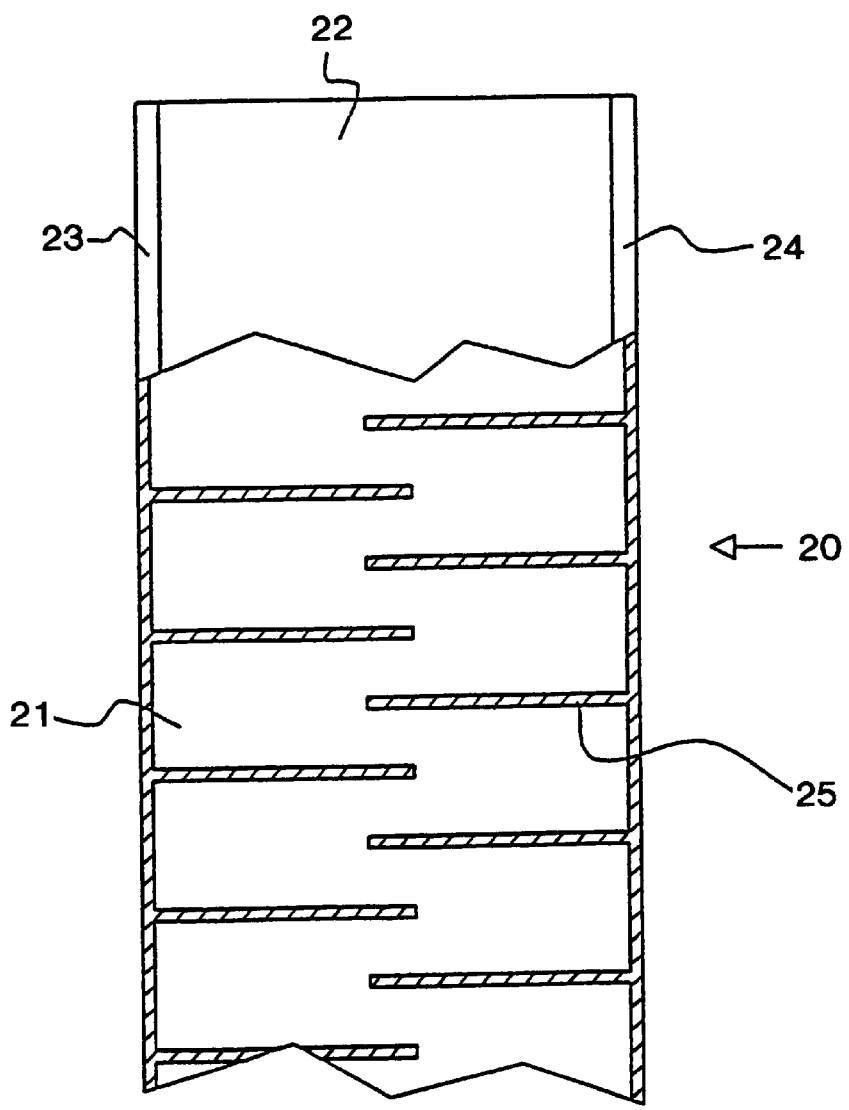
FIG. 6 shows a top view of the slot wedge from FIG. 5 according to FIG. 2.

In another embodiment of a slot wedge 20, illustrated in FIGS. 5 and 6, although the shape and slitting (incisions 25) of the metal spring core 11 from FIG. 2 are adopted for the metal spring core 21, the cross-sectional profile of the casing 22 according to FIG. 5 is modified, to the effect that the casing 22 as a whole is of thicker design, but, for this purpose, the underside 26 has a concave design and the top side 27 a convex design. For a predetermined overall thickness, such a convex/concave design of the wedge increases flexibility and reduces the prestressing force.

Figures 7, 8:
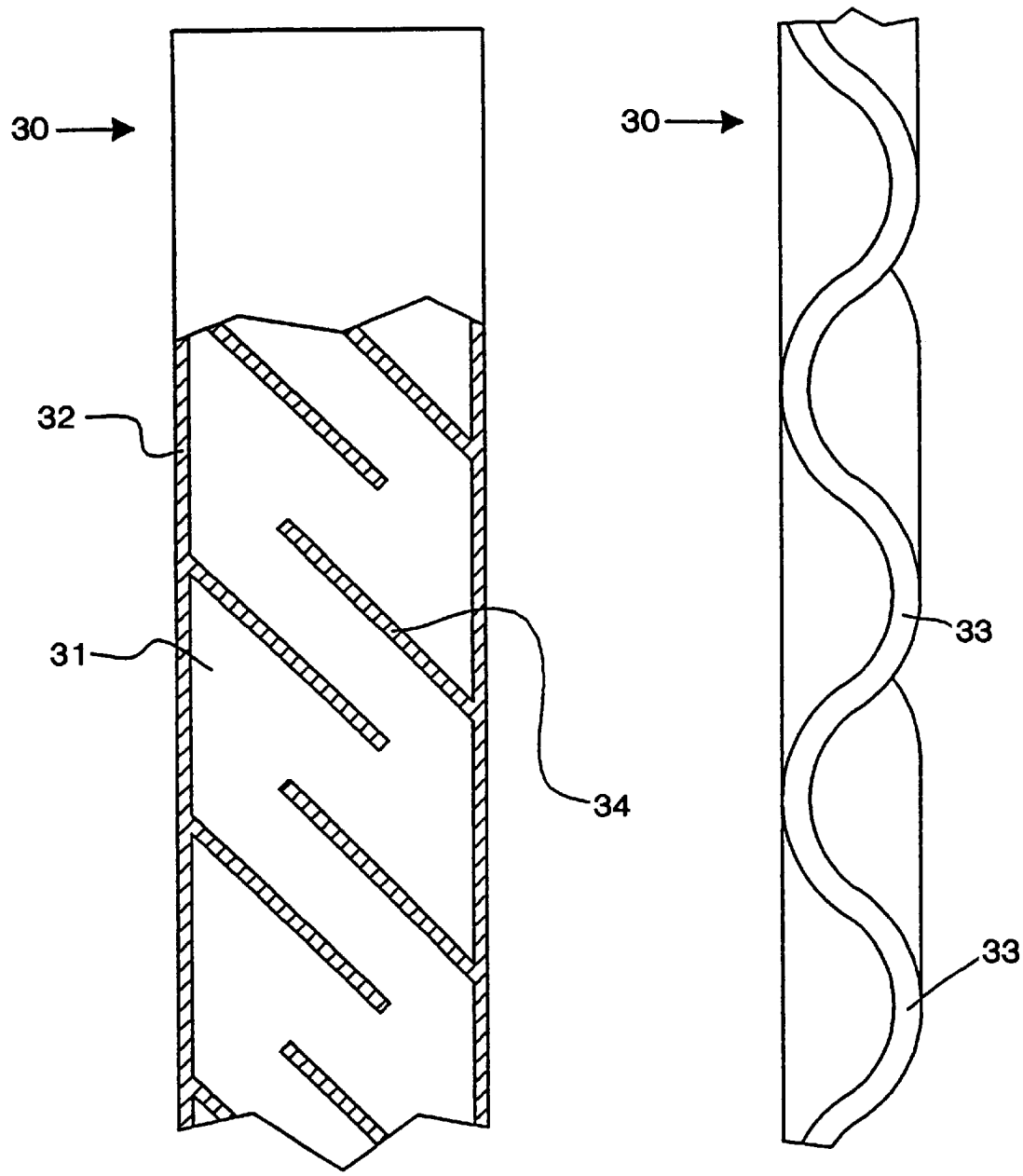
FIG. 7 shows a partially sectional top view of a first preferred exemplary embodiment of an insulating material element according to the invention in the form of a corrugated spring with incisions.
FIG. 8 shows a side view of the corrugated spring according to FIG. 7.
Figure 9:
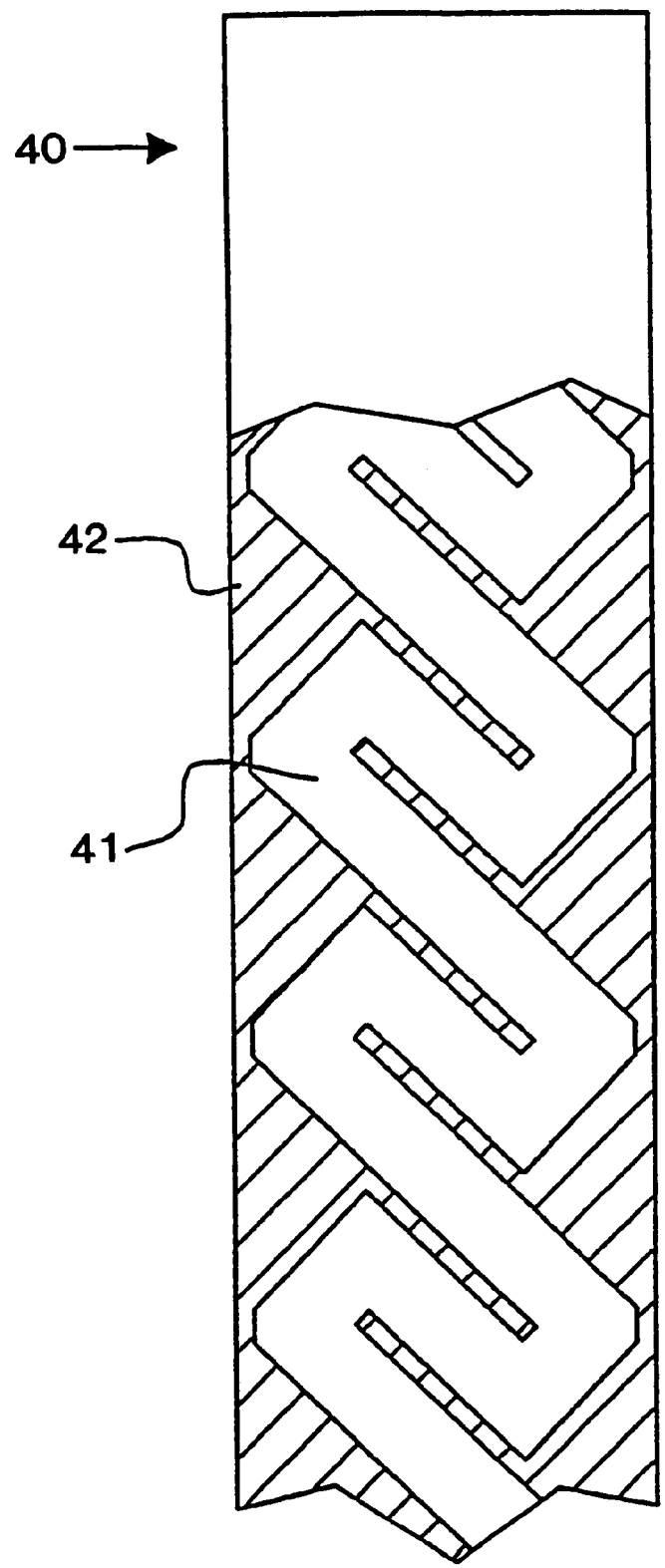
FIG. 9 shows a partially sectional top view of a second preferred exemplary embodiment of an insulating material element according to the invention in the form of a corrugated spring with a metal spring core corrugated in a meander-like manner.

The exemplary embodiments of the insulating material element according to the invention which are illustrated in FIGS. 7 to 9 relate to the design as a corrugated spring 30 or 40 which can be used, together with the corresponding slot wedges, for the elastic wedging of the winding. The corrugated spring 30 from FIGS. 7 and 8 comprises a metal spring core 31 which is provided with a corrugation and which, once again, is surrounded by a casing 32 made of fiber reinforced insulating material (high-temperature epoxy resin). The corrugated metal spring core 31 is joined together, in each case, with a glass/thermoset prepreg on the top side and underside, to form a sandwich, and is subsequently cured in an appropriate corrugated shape. The resulting corrugated spring 30 has the corrugation which can be seen in the side view of FIG. 8, with corrugations 33 which form an angle of less than 90°, preferably about 45°, with the longitudinal direction of the corrugated spring 30. The sliting with the alternating and overlapping incision 34 is likewise oriented at an oblique angle to the longitudinal axis, in such a way that the incisions 34 are perpendicular to the direction of the corrugations 33.

Whilst, in the example of FIG. 7, the eddy currents are limited by appropriate incisions 34 in an originally continuous striplike metal core 31, in the exemplary embodiment of FIG. 9 the corrugated spring 40 is armed against high eddy currents by a metal spring core 41 located in the casing 42 and designed as a strip corrugated in a meander-like manner, the meander-like corrugation forming an angle of less than 90°, preferably about 45°, with the longitudinal direction of the corrugated spring 40. In this case, the corrugations of the corrugated spring 40 are designed and oriented in the same way as the corrugations 33 of the corrugated spring 30 from FIGS. 7 and 8. It goes without saying, however, that, within the scope of the invention, the slitting and the casing may assume highly diverse designs, provided the desired mechanical or spring properties are preserved, the insulation of the core is ensured and the eddy currents and associated thermal loads can be restricted to an acceptable amount.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. An elastic insulating material element for wedging a winding of an electric machine in slots provided in a laminated body,
   wherein the insulating material element comprises a strip-like metal spring core which is embedded within a casing made of an insulating material,
   wherein the insulating material completely surrounds the metal spring core and adheres to the metal spring core, and the insulating material and the metal spring core form an integral unit,
   wherein the insulating material element is nonmagnetic, and
   wherein the metal spring core comprises means for limiting eddy currents induced in the metal spring core, the means for limiting induced eddy currents comprising slitlike incisions which, arranged so as to be distributed in the longitudinal direction of the metal spring core, project into the interior of said metal spring core, in each case starting from longitudinal edges of the metal spring core.

2. The insulating material element as claimed in claim 1, wherein the metal spring core consists of a nonmagnetic resilient metal.

3. The element of claim 2, wherein the metal spring core consists of a high-grade steel.

4. The insulating material element as claimed in claim 1, wherein the metal spring core has a thickness of a few millimeters.

5. The element of claim 4, wherein the metal spring core has a thickness between 2 and 3 millimeters.

6. The insulating material element as claimed in claim 1, wherein the incisions project into the interior of the metal spring core alternately from opposite ones of longitudinal edges of the metal spring core.

7. The insulating material element as claimed in claim 6, wherein the incisions overlap in the interior of the metal spring core.

8. The insulating material element as claimed in claim 1, wherein the incisions projecting from the opposite ones of the longitudinal edges are located opposite one another in pairs.

9. The insulating material as claimed in claim 1, wherein the casing consists of a fiber reinforced plastic.

10. The insulating material element as claimed in claim 9, wherein additional means for improving a mechanical connection between the metal spring core and the casing are provided.

11. The insulating material element as claimed in claim 10, wherein the metal spring core is pretreated with an adhesion promoter as an additional means for improving the mechanical connection between the metal spring core and the casing.

12. The insulating material element as claimed in claim 10, wherein the metal spring core is provided with bores, arranged in a distributed manner, wherein the insulating material of the casing fills the bores.

13. The element of claim 9, wherein the casing consists of a high-temperature thermoset or a high-temperature thermoplastic.

14. The insulating material element as claimed in claim 1, which is designed as a slot wedge.

15. The insulating material element as claimed in claim 14, wherein the slot wedge has a concave cross-sectional profile on the underside and a convex cross-sectional profile on the top side.

16. The insulating material element as claimed in claim 1, which is designed as a corrugated spring.

17. The insulating material element as claimed in claim 16, wherein the metal spring core is of corrugated design, and wherein the corrugations form an angle of less than 90° with the longitudinal direction of the corrugated spring.

18. The insulating material element as claimed in claim 17, wherein the metal spring core is formed from a strip having straight longitudinal edges, wherein the incisions are provided in the metal spring core for limiting the eddy currents, and wherein the incisions run essentially perpendicularly to the corrugations.

19. The insulating material element as claimed in claim 17, wherein the metal spring core is designed as a strip corrugated in meander-like manner, and the meander-like corrugation forms an angle of less than 90° with the longitudinal direction of the corrugated spring.

20. The element of claim 19, wherein the meander-like corrugation forms an angle of about 45° with the longitudinal direction of the corrugated spring.

21. The element of claim 17, wherein the corrugations form an angle of about 45° with the longitudinal direction of the corrugated spring.

22. The element of claim 1, wherein the winding is a stator winding.

23. The insulting material element of claim 1, wherein the insulting material of the casting fills the slitlike incisions.

24. An elastic insulating material element for wedging a winding of an electric machine in slots provided in a laminated body,
wherein the insulating material element comprises a strip-like metal spring core which is embedded within a casing made of an insulating material consisting of a fiber reinforced plastic,
wherein the insulating material completely surrounds the metal spring core and adheres to the metal spring core, and the insulating material and the metal spring core form an integral unit, and
wherein the metal spring core is provided with bores, arranged in a distributed manner, and the insulating material of the casing fills the bores and thereby improves a mechanical connection between the metal spring core and the casing.

25. An elastic insulating material element for wedging a winding of an electric machine in slots provided in a laminated body,
wherein the insulating material element comprises a strip-like metal spring core which is embedded within a casing made of an insulating material,
wherein the insulating material completely surrounds the metal spring core and adheres to the metal spring core, and the insulating material and the metal spring core form an integral unit, and
wherein the insulating material element is designed as a corrugated spring and the metal spring core is designed as a strip corrugated in meander-like manner, and the meander-like corrugation forms an angle of less than 90° with the longitudinal direction of the corrugated spring.

* * * * *